*Beals & Smith,*
*Hollow Auger.*

Nº 51,911.                               Patented Jan. 9 1866.

Witnesses:
Rufus H. Sanford
Asa Kirtland

Inventors:
Fordyce Beals
Major Smith
Ball
John E. Earl

UNITED STATES PATENT OFFICE.

FORDYCE BEALS AND MAJOR SMITH, OF NEW HAVEN, CONNECTICUT.

IMPROVEMENT IN HOLLOW AUGERS.

Specification forming part of Letters Patent No. 51,911, dated January 9, 1866.

*To all whom it may concern:*

Be it known that we, FORDYCE BEALS and MAJOR SMITH, of New Haven, in the county of New Haven and State of Connecticut, have invented a new and useful Improvement in Hollow Augers; and we do hereby declare the following, when taken in connection with the accompanying drawings and the letters of reference marked thereon, to be a full, clear, and exact description of the same, and which said drawings constitute part of this specification, and represent, in—

Figure 1:
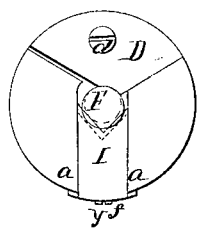
Figure 2:
Figure 4:
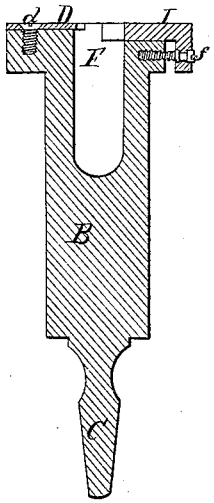
Figure 3:
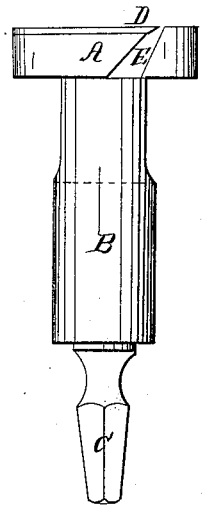

Figure 1, an end view of the auger as constructed with our improvement; Fig. 2, a side view; Fig. 3, a side view taken from the opposite side of Fig. 2; Fig. 4, a longitudinal central section cutting through X Y, Fig. 1; and in Fig. 5 a side view, showing an adjustment for the cutter.

Our invention relates to an improvement in hollow augers, or such as are used for forming tenons upon the end of spokes or for similar purposes; and it consists in the peculiar construction whereby the auger is made adjustable, so as to form tenons, &c., of different diameters; also, in an adjustment of the cutter, whereby it may be made to cut more or less, as desired.

To enable others skilled in the art to construct and use our improvement, we will proceed to fully describe the same as illustrated in the accompanying drawings.

A is the cutter-head, fixed to or a part of a spindle, B, which is provided with a shank, C, so as to be used in an ordinary brace, or to be formed according to the instrument to which it is to be attached for use. The form of these parts does not differ materially from the common hollow auger.

Upon the face of the head, in a recess prepared for it, we place a cutter, D, secured to the head by a screw, d, or in any convenient manner. A throat, E, (see Fig. 3,) permits the shavings to pass freely away from the cutter in the usual manner.

As ordinarily constructed, a hole, F, is made through the head the size of the tenon to be cut, and the cutter D, thus arranged, would cut away from the wood placed against the cutter-head, leaving the tenon the size of the hole through the cutter-head. Thus it is necessary to have different augers, with holes varying according to the size of the tenons to be formed. To avoid the necessity of these different instruments, and to accomplish in one what has heretofore been done by many, we place an adjustable slide, I, in the face of the cutter-head, so as to be moved in its guides *a a*. The inner end of the said slide we make V-shaped, and the said slide is moved to or from the center by means of an adjusting-screw, *f*. (See Fig. 4.) By moving the said slide out from the position denoted in whole lines, Fig. 1, to that denoted in broken lines, the size of the opening or hole would be enlarged from that denoted in red to that denoted in blue, Fig. 1, thus enlarging the size of the tenon formed, and thus the size of the tenon may be increased or decreased by simply turning the screw *f* to move the slide I. Other devices for moving the said slide may be employed. We prefer the one we have shown.

Figure 5:
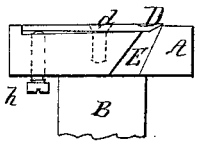

If the cutter be fitted to its recess in the cutter-head so as to fill its recess, the depth of the cut will depend upon the thickness of the cutter above the cutter-head at the edge of the cutter, which would be unchangable. It is often desirable to make the cut more or less deep, as the wood to be wrought is harder or softer. To adjust the cutter for this object we form the recess upon the face of the cutter-head, to receive the cutter deeper at the rear end of the cutter, as seen in Fig. 5, and insert a screw, *h*, from the rear of the cutter-head, so as to raise the rear end of the cutter, which operation will lower the cutting-end and thus reduce the depth of the cut; or, if greater depth of cut be required, lower the rear end of the cutter, and, when properly adjusted, secure the cutter by means of the screw *d*.

We are aware that hollow augers have heretofore been made adjustable by various devices. We do not therefore broadly claim an adjustable hollow auger; neither do we broadly claim adjusting a cutter so as to increase or decrease the depth of cut; but, Having fully described our improvement, what we claim as new and useful, and desire to secure by Letters Patent, is—

1. The combination of the slide I with the cutter D, constructed and arranged to operate substantially as and for the purpose specified.

2. The construction and arrangement of the cutter D, adjusting-screw $h$, and set-screw $d$, combined so as to operate for the purpose of increasing or diminishing the depth of cut of the auger.

FORDYCE BEALS.
MAJOR SMITH.

Witnesses:
RUFUS H. SANFORD,
JOHN E. EARLE.